Nov. 29, 1960  H. HURVITZ  2,962,712
RADAR SYSTEM
Filed June 12, 1958
FIG. 1
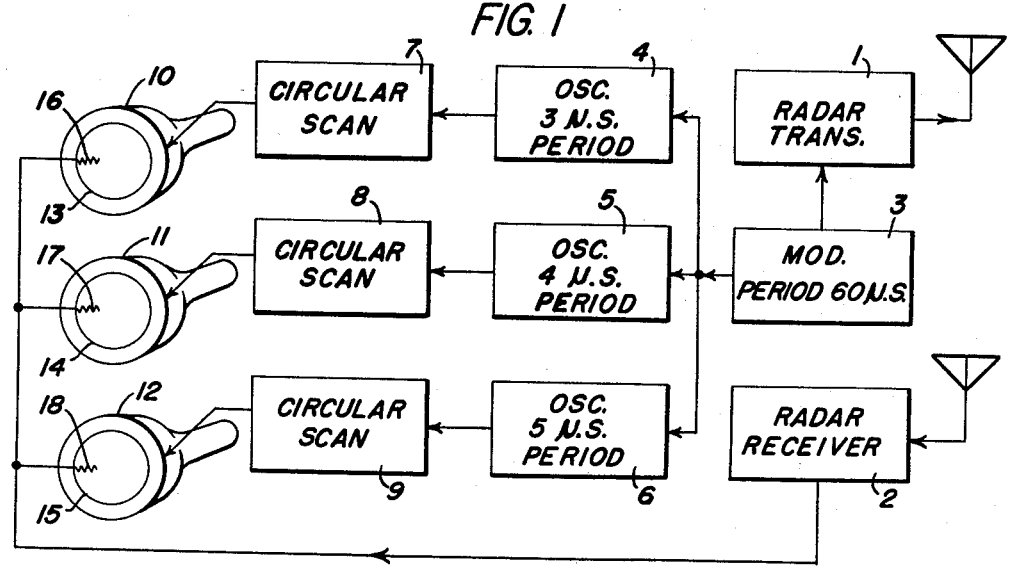
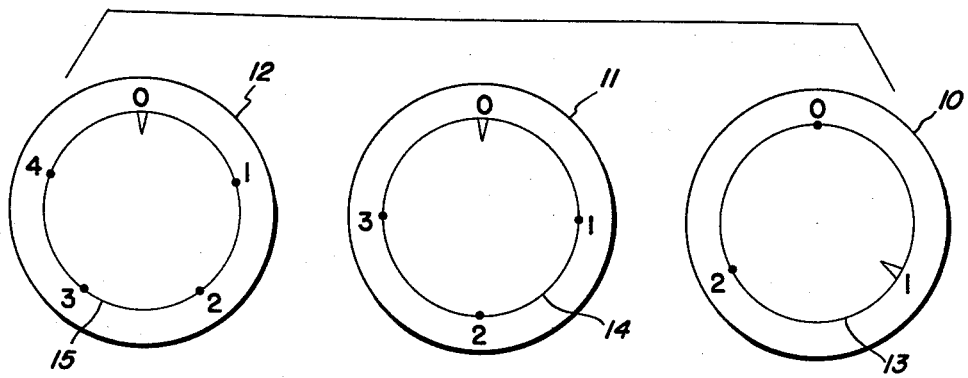
FIG. 2

United States Patent Office 2,962,712
Patented Nov. 29, 1960

2,962,712
RADAR SYSTEM

Hyman Hurvitz, Washington, D.C., assignor to Melpar, Inc., Falls Church, Va., a corporation of New York Filed June 12, 1958, Ser. No. 741,619

6 Claims. (Cl. 343—13)

The present invention relates generally to a system for measuring time intervals, and more particularly to pulse radar systems.

In the conventional pulse radar system we measure elapsed time between a transmitted pulse and an echo pulse generated by reflection of the transmitted pulse from a target, by initiating trace of a base line on a cathode ray oscilloscope in response to the transmitted pulse and modulating the trace in response to the echo pulse. The modulation may represent generation of a pip or a change of intensity of the trace. In such systems limitation of accuracy of measurement arises because of the limitation on length of trace available in a cathode ray oscilloscope of reasonable size. The eye can read pip positions to an accuracy of about $\frac{1}{20}''$. For a five inch trace, in consequence, accuracy of reading is about 1%. Visual accuracy can be increased by employing longer traces, but a practical limit is soon reached in respect to possible length of trace.

According to the present invention the effect of a long time of trace may be attained by utilizing a repetitive plurality of short times of trace, each of different length with respect to any other. For example, repetitive and simultaneous traces of 3, 4 and 5 microseconds may be employed, on three separate oscilloscopes, and thereby one provides an effective trace length of 60 µs., i.e. the product of the factors. It will be noted, and it is characteristic of the present system, that the numbers employed are relatively prime.

By means of such a system any radar range to 60 µs. may be measured by starting all the repetitive traces, i.e. of 3, 4 and 5 µs., in response to each transmitted pulse, and modulating all the repetitive traces in response to the echo pulse.

For example, assume an object at a range of 40 µs., in a radar system having a maximum range of 60 µs. The echo pulse will occur at 1 µs. for the repetitive 3 µs. trace, on a first oscilloscope. It will occur at 0 times within the 4 and 5 µs. repetitive traces on second and third oscilloscopes. This occurs because for the 3 µs. trace the echo arrives 1 µs. after the thirteenth repetitive trace, while for the 4 and 5 µs. traces the echo occurs at the beginning of the 11th and 9th repetitive traces, respectively, or, what is the same thing, at the end of the 10th and 8th traces, respectively. It is not necessary to know the number of traces which have been completed on any oscilloscope when the echo occurs, according to the present system.

The present technique permits extreme accuracy of time measurement, even when small oscilloscopes are employed. For example, we may employ repetitive traces of 9, 10 and 11 time units each. Accuracy of one part in 9×10×11 units, or about one part in 1,000 is then possible. Three oscilloscopes may be employed, which may be each read to one part in 9, 10 and 11, respectively, to provide the total accuracy of one part in about 1,000. This could be accomplished in practice with three one inch oscilloscopes. In fact, even employment of 19, 20 and 21 time units per trace is possible, employing one inch traces. This enables range to be read to an accuracy of about one part in 8,000. By adding a further scope employing 17 time units per trace, accuracy may be increased to one part in about 135,000.

While the system is suitable for use only for acquiring a single target (multiple targets leading to confusion), the tremendous accuracy available, by simple and economical devices, provide an extremely valuable and accurate tool for many purposes, such as fire control radar. For such systems gating may be resorted to, to assure reception of signals from a single target only.

It is, accordingly, a feature of the present invention to provide a system for increasing the effective length of a duration representative visual trace.

It is another feature of the invention to effect measurement of time intervals by means of plural traces of different durations.

It is still another object of the invention to provide a pulse radar system in which a plurality of small radar system visual display units is employed to provide the effect of a single large visual display unit, for range measurement.

It is another object of the invention to provide the effect of a long trace time, in terms of repeated short time traces.

The above and still further objects, features and advantages of the present invention will become apparent upon consideration of the following detailed description of one specific embodiment thereof, especially when taken in conjunction with the accompanying drawings, wherein:

Figure 1 of the drawings is a schematic circuit diagram of a system according to the invention; and Figure 2 illustrates the faces the indicators of Figure 1 for a given range.

Proceeding now to describe a preferred embodiment of the invention, by reference to the accompanying drawings, the reference numeral 10 denotes a radar transmitter and the reference numeral 11 a radar receiver, which together constitute the essential elements of a conventional radar system, or sonar system, of the pulse type. In such systems pulsed carriers are transmitted to remote targets and echo pulses reflected from the carrier are received, after a time elapse representative of range of the target. It is then required to measure this time elapse, in order to obtain a measure of range of the target.

The transmitted pulses are generated in response to modulator pulses provided by modulator 3, which are assumed, for the sake of example, to have a period of 60 µs. This time period then corresponds with a maximum range of the radar system.

I provide three oscillators 4, 5 and 6, which have relatively prime periods of 3, 4 and 5 µs. These values are selected for example only, but the relatively prime relation is essential. These oscillators may have sinusoidal outputs, and are synchronized from the output of modulator 3. Such synchronization is readily feasible since the time elapses of 3, 4 and 5 µs. are each divisible without remainder into the period of the modulator.

The oscillators 4, 5 6 drive circular scan generators 7, 8 and 9, respectively, which are associated wtih oscilloscopes 10, 11 and 12, respectively, causing the traces 13, 14, 15, generated by the oscilloscopes to complete circular traces in 3, 4 and 5 µs., respectively. While horizontal traces might well have been employed, instead of circular trace, these present problems of retrace time, which are absent when circular traces are employed.

The oscilloscopes 10, 11, 12 are provided with radial deflection electrodes, as 16, 17, 18, which are connected in parallel to the output of receiver 2, and generate radially directed pips on traces 13, 14, 15 in response to received echo pulses.

We may assume, for the sake of example, that a target exists at a range corresponding wtih 40 $\mu$s. The beam of oscilloscope 10 will have rotated thirteen complete revolutions and ⅓ of another. The position of the pip will be at 1 $\mu$s.

By reference to oscilloscope 10 above it will be impossible to determine whether the pip corresponding to the target correspond with 1, 4, 7, 10 . . . 40, 43 . . . $\mu$s. However, the same echo pulse which had generated a pip at 1 $\mu$s. on the face of oscilloscope 10 had also generated pips at the 0 position of the oscilloscope 11 and 12. For the oscilloscope 11 a pip at 0 position may represent ranges of 0, 4, 8, 12 . . . 40, 44 . . . microseconds. For the oscilloscope 12 a pip at 0 position may represent ranges of 0, 5, 10 . . . 40, 45 . . . microseconds. It will be noted that the designated pips can only represent a range of 40 $\mu$s. since this is the only value simultaneously possible for all three oscilloscopes.

The combination of the several readings presents a measure of range without ambiguity.

On the basis that each oscilloscope can be read to .1 $\mu$s., which is not unreasonable, even for a 1″ oscilloscope, the accuracy of the system may be considered to be one part in 600. To obtain this accuracy in a single oscilloscope would require one having a trace length of about 30″, or a ten inch oscilloscope. Such an oscilloscope is extremely bulky in comparison with three 1″ oscilloscopes, and requires far greater anode voltages, deflection voltages, and the like. The total saving of cost, weight and space is therefore far disproportionate to the added complexity of the system.

While I have described and illustrated one specific embodiment of the present invention, it will become apparent that variations of the specific details of construction may be resorted to without departing from the true spirit and scope of the invention as defined in the appended claims.

I claim:

1. In a radar system, a source of transmitted pulses, two cathode ray tubes having each means for generating a repetitive base line representative of range, means for modulating said base lines in response to an echo pulse responsive to the transmitted pulse, and means for repeating one of said base lines $m$ times while the other base line is repeated $n$ times, where $m$ and $n$ are relatively prime integers and greater than unity.

2. In a system for measuring time elapse T between two signals, means for generating plural repetitive time bases, the ratio of any two of said time bases being rational fractions composed of relatively prime integers greater than unity, the product of said time bases being at least T and means for indicating the times of said signals with respect to all said plural repetitive time bases.

3. In a system for measurng the time difference T between two signals, where T is a value smaller than a value A, means for generating a plurality of repetitive time bases of lengths $m, n, o, \ldots$ where the product of said lengths is A and where said lengths are relatively prime integers greater than unity, and means for indicating the times of said signals with respect to all said time bases.

4. In a system for measuring the time difference T between two signals, means for generating first repetitive time bases each of length $m$, means for generating second repetitive time bases each of length $n$, where $m$ and $n$ are relatively prime integers greater than unity, and means for indicating the positions of said signals with respect to both said time bases.

5. In a system for measuring the time difference T between two signals, where T is equal to or greater than a value A, means for generating first repetitive time bases each of length $m$, means for generating second repetitive time bases each of length $n$, where $m$ and $n$ are relatively prime integers greater than unity and $mn$ is not greater than A, and means for indicating the positions of said signals with respect to said time bases.

6. In a radar system, a source of transmitted pulses having a period A, means for generating plural periodic scanning signals having different periods, said periods being relatively prime integers greater than unity, a plurality of visual display units each having a display generated in synchronism with a different one of said scanning signals, the product of said different periods being A, and means for modulating all said displays simultaneously in response to an echo pulse.

References Cited in the file of this patent

UNITED STATES PATENTS

| | | |
|---|---|---|
| 2,403,626 | Wolff et al. | July 9, 1946 |
| 2,572,014 | De Rosa | Oct. 23, 1951 |
| 2,644,156 | Schneider | June 30, 1953 |
| 2,730,713 | Wolff | Jan. 10, 1956 |